(12) United States Patent
Strommer et al.

(10) Patent No.: US 6,588,833 B2
(45) Date of Patent: Jul. 8, 2003

(54) MOTOR VEHICLE ROOF WITH INTEGRATED FAN

(75) Inventors: Markus Strommer, Munich (DE); Helmut Teschner, Finning (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/001,200

(22) Filed: Dec. 4, 2001

(65) Prior Publication Data

US 2002/0130534 A1 Sep. 19, 2002

(30) Foreign Application Priority Data

Dec. 5, 2000 (DE) .......................... 100 60 610

(51) Int. Cl.[7] .............................. B60J 7/043
(52) U.S. Cl. ........................ 296/214; 454/129
(58) Field of Search ................ 296/214; 454/128–132

(56) References Cited

U.S. PATENT DOCUMENTS 4,978,165 A * 12/1990 Schreiter et al. ........ 296/214 X

FOREIGN PATENT DOCUMENTS

| DE | 36 43 436 C2 | 2/1988 |
|---|---|---|
| DE | 39 37 642 A1 | 6/1990 |
| DE | 39 38 259 C1 | 6/1991 |
| DE | 197 03 640 A1 | 8/1998 |
| DE | 198 15 893 A1 | 10/1999 |
| EP | 0 448 807 B1 | 10/1991 |

OTHER PUBLICATIONS

Air Filtration Products, Inc. Website, "Plastic Fan Filter Assembly", pp. 1–7, copyright 1998–2001.*
Air Filtration Products, Inc. Website, "Fan Filter Media", pp. 1–3, copyright 1998–2001.*
Mark Snyder Electric.com, Website, Solar fan catalog, pp. 1–5, copyright 1999.*

* cited by examiner

*Primary Examiner*—Dennis H. Pedder
(74) *Attorney, Agent, or Firm*—Nixon Peabody LLP; David S. Safran

(57) ABSTRACT

A motor vehicle roof with an adjustable closing element for an opening in the fixed roof skin for alternatively closing or at least partially clearing the opening. The roof includes a sliding headliner located underneath the roof opening and the closing element, the sliding headliner being movable to at least one of cover and at least partially clear the closing element and the roof opening with respect to the vehicle interior. At least one electrically operated fan is integrated into the sliding headliner and is operable such that it blows air through the sliding headliner into the vehicle interior. Each fan on the intake side and/or on the exhaust side is provided with a filter to clean the air which has been blown into the vehicle interior.

18 Claims, 1 Drawing Sheet

MOTOR VEHICLE ROOF WITH INTEGRATED FAN

BACKGROUND OF THE INVENTION

1. Field of the Invention

The invention relates to an openable motor vehicle roof with an adjustable closing element for alternatively closing or at least partially clearing an opening in a fixed roof skin.

2. Description of the Related Art

One such generic motor vehicle roof is known from European Patent EP 0 448 807 B1, which has a closing element made as a transparent cover which can be raised with its rear edge and into which a solar module as a power source for the fans is integrated. A sliding headliner is provided and includes a front part into which axial flow fans are integrated and which with the cover raised with its rear edge can be raised with its front edge. The liner can also be locked on the cover in order to provide fresh air to the motor vehicle interior in this position by the fans. This position is intended mainly as auxiliary ventilation. The disadvantage in this motor vehicle roof is that with the blown-in fresh air, contaminants, odors, pollutants or irritants such as dust or pollen can also enter the motor vehicle interior in larger amounts.

German Patent Publication DE 39 38 259 C1 discloses a motor vehicle roof in which an axial flow fan is mounted between the rear edge of the roof opening and the back end area of the cover such that when the rear edge of the cover is raised the fan is folded up with its front end, the fan in this position blowing fresh air through the gap between the rear edge of the roof opening and the rear edge of the cover into the motor vehicle interior.

Published German Patent Application DE 36 43 436 A1 discloses an openable motor vehicle roof in which in the adjustable cover for the roof opening a cross flow fan is integrated in order to blow fresh air into the motor vehicle interior.

SUMMARY OF THE INVENTION

A primary object of this invention is to devise an openable motor vehicle roof in which the motor vehicle interior can also be efficiently ventilated when standing still and still the accumulation of contaminants, odors, pollutants or irritants in the motor vehicle interior can be prevented.

A further object of this invention is to devise an openable motor vehicle roof in which the ventilation function can be matched as effectively as possible to the respective operating circumstances.

The first object is achieved by a motor vehicle roof with an adjustable closing element for an opening in the fixed roof skin for alternatively closing or at least partially clearing the opening. The motor vehicle roof includes a sliding headliner which is located underneath the roof opening and the closing element, the liner being adapted to move to alternatively cover or at least partially clear the closing element and the roof opening with respect to the vehicle interior. At least one electrically operated fan is integrated into the sliding headliner and is operable such that the fan blows fresh air through the sliding headliner into the vehicle interior. In accordance with the invention, the at least one fan on the intake side and/or on the exhaust side is provided with a filter for cleaning air which is been blown into the motor vehicle interior.

In this approach, it is advantageous that, on the one hand, by blowing in fresh air at the same fan output, higher volumetric flow, and thus, at elevated temperatures, better cooling performance can be achieved than in exhaust operation. This because, by the mode of operation of the ventilation devices in the motor vehicle, the vehicle is less tight in the blow-in state, i.e., at an overpressure, than in exhaust operation, i.e., at an underpressure. On the other hand, by providing a filter for each fan, penetration of contaminants, odors, pollutants or irritants, such as dust or pollen, in ventilation operation can be prevented The second object is achieved by a motor vehicle roof with an adjustable closing element for an opening in the fixed roof skin for alternatively closing or at least partially clearing the opening. A sliding headliner is provided and is located underneath the roof opening and the closing element and adapted for movement to alternatively cover or at least partially clear the closing element and the roof opening with respect to the vehicle interior. At least one electrically operated fan is integrated into the sliding headliner and is operable such that the fan blows air through the sliding headliner into the vehicle interior. In accordance with this embodiment, the at least one fan is made such that the direction of the air flowing through the fan can be reversed to exhaust the air through the sliding headliner out of the vehicle interior to the outside.

In this approach, it is advantageous that the ventilation mode can be purposefully matched to the operating conditions prevailing at the time, and thus, the ventilation function can be optimized. For example, while driving, when enough electricity is available for operating the fan or fans, the mode of operation of the fans can be chosen such that they exhaust, by which good ventilation of the motor vehicle interior even in stopped or slow traffic can be achieved, while the fans in auxiliary operation. When only little electricity is available, the fan can be operated to blow in air in order to achieve cooling of the motor vehicle interior that is as good as possible.

It is especially preferred when the fan or fans are located in the rear area of the sliding head liner. In such a case, with the sliding headliner closed and the closing element or cover pivoted up on its rear edge, a ventilation gap is opened in the immediate vicinity to the fans so that ventilation takes place especially in auxiliary operation over a very short flow path.

The invention is explained below by way of example using the attached drawings.

DETAILED DESCRIPTION OF THE INVENTION

Figure 1:
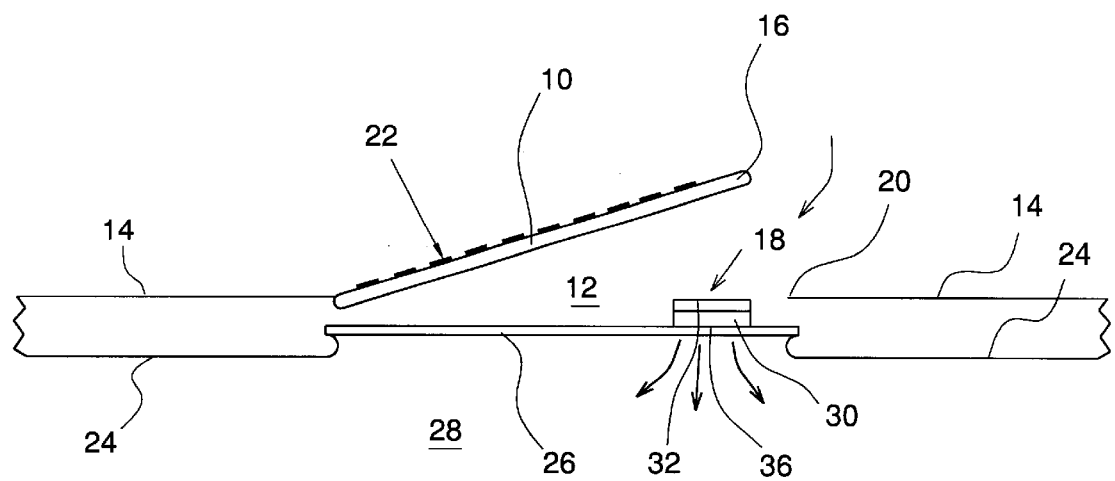
FIG. 1 shows a schematic lengthwise section through the motor vehicle roof in accordance with the invention.

As shown in FIG. 1, a transparent cover 10 for the opening 12 in the fixed roof skin 14 of a motor vehicle is provided and which can be raised with its rear edge 16 by way of a conventional drive in order to clear a gap 18 between the rear edge 16 of the cover and the rear edge 20 of the roof opening 12. The cover 10 is provided in the conventional manner with a partially transparent solar module 22 (shown only schematically in FIG. 1 by way of an interrupted line) which can be used especially with the vehicle stopped as a power source.

Underneath the fixed roof skin 14, a fixed headliner 24 is provided and which is interrupted in the area of the roof opening 12. In this area, there is a sliding headliner 26 which is made as a rigid plate and which can be moved manually or by way of a drive (not shown). The sliding headliner 26 is made conventionally in order to selectively cover the roof opening 12 or the cover 10 with respect to the motor vehicle interior 28 in order to prevented unwanted light incidence through the cover 10 or the roof opening 12 if this is desired by the vehicle passengers. To clear the roof opening 12 or the cover 10, the sliding headliner 26 can be pushed backwards over the fixed headliner 24.

In the rear area of the sliding headliner 26 are a plurality of fans 30 which are located next to one another and which are each mounted in an opening in the sliding headliner 26. The fans 30 are made as axial flow fans in order to enable air exchange between the motor vehicle interior 28 and the outside area through the sliding headliner 26 and via the roof opening 12 and the gap 18.

The fans 30 can be operated by the corresponding choice of the direction of rotation of the fan motor such that they intake outside air via the gap 18 and the roof opening 12 and blow it into the motor vehicle interior 28, as is shown by the arrows in FIG. 1. This mode is advantageous mainly with the motor vehicle stopped and with strong incident solar radiation since the cool fresh outside air which is blown into the motor vehicle interior 28 displaces warm air especially in the roof area and replaces it by this cooler outside air. Accordingly, this reduces the temperature, and thus, the heat-up of the motor vehicle interior 28. With the motor vehicle stationary the fans 30 are preferably supplied, as much as possible, with the solar current generated by the solar module 22 in order to prevent discharge of the vehicle battery.

Fans 30 may be provided either on their side (bottom) facing the motor vehicle interior 28 or alternatively the fans 30 may be provided on their side (top) facing the roof opening 12, or with one filter on each of the top and bottom sides in order to prevent contaminants, odors, pollutants or irritants such as flower pollen contained in the air from penetrating into the motor vehicle interior 28. One such filter 32 is located on the side of the sliding headliner 26 facing the roof opening 12. The filters 32 can be made as particulate filters and/or activated charcoal filters for removing dust and pollen from the blown-in air. In this way, unpleasant odors in the motor vehicle interior or accumulation of irritants or pollutants in the motor vehicle interior 28 can be prevented. The filters 32 which are shown only schematically can be made, for example, in the form of mats.

On the side facing the motor vehicle interior 28, the fans 30 are each provided with a protective grating 36 in order to prevent damage to the fans 30 or danger to the passengers by the rotating fan blades. By the arrangement of the fans 30 in the rear area of the sliding headliner 26, especially near the back edge of the sliding headliner 26, air exchange takes place with the sliding headliner 26 closed and the cover 10 pivoted up over a very short flow path through the gap 18 so that less flow resistance occurs. This is especially advantageous when there is a filter 32 on the fan 30 which forms a certain flow resistance. When the sliding headliner 26 is opened, first the rear area of the sliding headliner 26 is pushed over the fixed headliner 24 so that after a short opening motion the fans 30 which are located in rear area are also covered and no longer visually appear.

Figure 2:
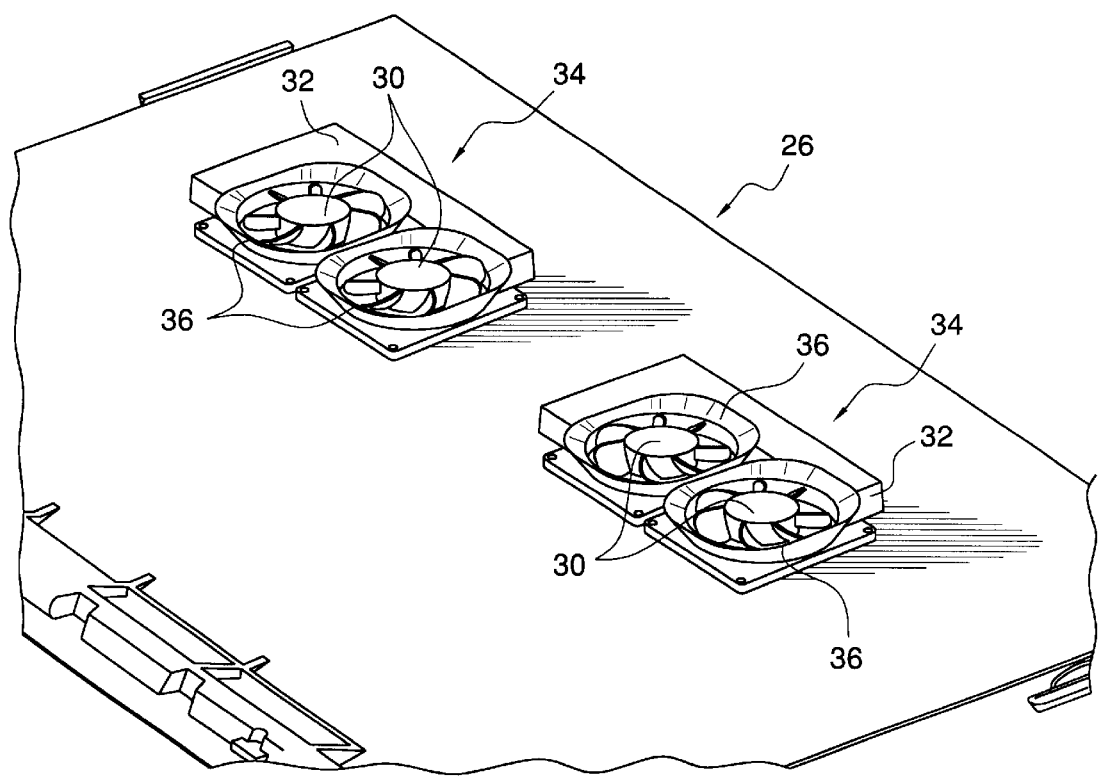
FIG. 2 shows a perspective top view of the sliding headliner of the motor vehicle roof with a fan mechanism.

As shown in FIG. 2, distributed over the width of the sliding headliner 26 are two fan units 34 which each contain two radial flow fans 30, on whose side facing the roof opening 12 are filters 32 (shown schematically). Preferably, the fans 30 are made such that the air which flows through them can be alternatively reversed so that instead of the operating mode shown in FIG. 1, in which fresh air is blown into the motor vehicle interior 28, ventilation of the motor vehicle interior 28 by suction of air to the outside can be alternatively achieved. This reversal of the flow direction can be accomplished, for example, by the motor which drives the fan 30 being made as a reversible motor and its direction of rotation being reversible. This operating mode can be advantageous especially when the vehicle is driving, especially when the vehicle speed is low or the vehicle is standing still, since, in this case, suction action by the head wind sufficient to adequately passively ventilate the motor vehicle interior 28 does not occur. In this case, supporting the ventilation by the fans 30 can be advantageous, power being supplied to the fans 30 in this mode preferably via the vehicle electrical system. Furthermore, the service life of the filters 32 can also be increased by this flow reversal. Radial fans or cross flow fans instead of axial fans can also be used.

The cover 10 can, for example, be the cover of a sliding roof, a sliding and lifting roof, or a spoiler roof. The fans 30 can be located basically not only in the rear area of the sliding headliner 26, but also elsewhere in the sliding headliner 26, and they can be located in succession basically also in the lengthwise direction. Preferably, the fans are only operated when the roof opening 12 is at least partially cleared by the cover 10.

What is claimed is:

1. Motor vehicle roof comprising:
    an adjustable closing element for closing or at least partially clearing an opening in a fixed roof skin of the motor vehicle;
    a sliding headliner positioned underneath the roof opening, the sliding headliner being movable between a closed position which covers the roof opening and at least one open position that at least substantially exposes the closing element and the roof opening with respect to an interior space in the motor vehicle;
    at least one fan integrated into the sliding headliner, the at least one fan being electrically operable such that it blows air through the sliding headliner and into the interior space of the motor vehicle, the at least one fan being located in a rear area of the sliding headliner,
    wherein a filter is provided on at least one of an intake side and an exhaust side of the at least one fan to clean the air blown into the interior space of the motor vehicle.

2. Motor vehicle roof comprising:
    an adjustable closing element for closing or at least partially clearing an opening in a fixed roof skin of the motor vehicle;
    a sliding headliner positioned underneath the roof opening, the sliding headliner being movable between a closed position which covers the roof opening and at least one open position that at least substantially exposes the closing element and the roof opening with respect to an interior space in the motor vehicle;
    at least one fan integrated into the sliding headliner, the at least one fan being electrically operable such that it blows air through the sliding headliner and into the interior space of the motor vehicle, and being located in a rear area of the sliding headliner,
    wherein said at least one fan is operable such that the direction of the air flowing therethrough can be reversed to exhaust the air out of the interior space of the motor vehicle, through the sliding headliner and to the outside of the motor vehicle.

3. Motor vehicle roof as claimed in claim 2, wherein a filter is provided on at least one of the intake side and the exhaust side of said at least one fan to clean the air blown into the interior space of the motor vehicle.

4. Motor vehicle roof as claimed in claim 3, wherein the filter comprises at least one of a particulate filter and an activated charcoal filter.

5. Motor vehicle roof as claimed in claim 4, wherein said at least one fan is driven by a reversible motor.

6. Motor vehicle roof as claimed in claim 5, wherein said at least one fan is operable such that it blows air into the interior of the motor vehicle even when the motor vehicle has stopped.

7. Motor vehicle roof as claimed in claim 6, wherein said at least one fan is operable such that it takes in air from the vehicle interior even when the motor vehicle is being driven.

8. Motor vehicle roof as claimed in claim 7, wherein said at least one fan is operable only when the closing element is at least partially opened.

9. Motor vehicle roof as claimed in claim 8, wherein said at least one fan comprises an axial flow fan.

10. Motor vehicle roof as claimed in claim 9, wherein the motor vehicle roof is a solar roof having a solar generator for supplying electric current to said at least one fan at least when the motor vehicle has stopped.

11. Motor vehicle roof as claimed in claim 10, wherein the solar generator is located on the closing element.

12. Motor vehicle roof as claimed in claim 11, wherein the solar generator is a partially transparent module.

13. Motor vehicle roof as claimed in claim 12, wherein the sliding headliner is made as a rigid plate.

14. Motor vehicle roof as claimed in claim 13, wherein the filter is located on a side of the sliding headliner which faces the closing element.

15. Motor vehicle roof as claimed in claim 14, wherein the closing element is a cover for at least one of a sliding roof, a sliding and lifting roof, and a spoiler roof.

16. Motor vehicle roof as claimed in claim 15, wherein the cover is composed of a transparent material.

17. Motor vehicle roof as claimed in claim 1, wherein the fan is carried by the headliner extending upwardly from the headliner in a manner so as not to interfere with retraction thereof to between the fixed roof skin and a fixed headliner located under the fixed roof skin.

18. Motor vehicle roof as claimed in claim 2, wherein the fan is carried by the headliner extending upwardly from the headliner in a manner so as not to interfere with retraction thereof to between the fixed roof skin and a fixed headliner located under the fixed roof skin.

* * * * *